United States Patent [19]

Maag

[11] 4,062,125
[45] Dec. 13, 1977

[54] APPARATUS FOR TESTING THE TOOTH FLANKS OF INVOLUTE GEARING

[75] Inventor: Oskar Maag, Zurich, Switzerland

[73] Assignee: Maag Gear-Wheel & Machine Company Limited, Zurich, Switzerland

[21] Appl. No.: 675,821

[22] Filed: Apr. 12, 1976

[30] Foreign Application Priority Data

Apr. 17, 1975 Switzerland .................. 4900/75

[51] Int. Cl.² ................................. G01B 7/28
[52] U.S. Cl. ................................. 33/179.5 D
[58] Field of Search .............. 33/179.5 D, 179.5 R, 33/179.5 E, 174 P

[56] References Cited

U.S. PATENT DOCUMENTS

| 2,206,853 | 7/1940 | Poupitch | 33/179.5 D |
| 2,770,048 | 11/1956 | Ernst | 33/179.5 D |

Primary Examiner—Richard E. Aegerter
Assistant Examiner—Willis Little
Attorney, Agent, or Firm—Toren, McGeady and Stanger

[57] ABSTRACT

Gear tooth testing apparatus with a rotary test gear mounting has a mechanism for controlling the relative movements of a test probe and of the gear under test, the motions being interconnected by a lever pivotable about the gear mounting axis. The lever has a second pivot connection to a straight-edge that rolls on a rolling cylinder co-rotating with the gear to generate an involute motion, and a third pivot connection to an auxiliary slide associated with the probe. The lever is longitudinally displaceable with respect to all three pivot axes whereby its position relative to the pivot axes at different settings of the apparatus is controllable in a manner limiting the necessary size of the apparatus for a given working capacity.

4 Claims, 7 Drawing Figures

APPARATUS FOR TESTING THE TOOTH FLANKS OF INVOLUTE GEARING

BACKGROUND OF THE INVENTION

The invention relates to an apparatus for testing the tooth flanks of gearing, e.g. gear wheels or gear segments, having involute toothing.

Such testing apparatus is known comprising a rolling generating cylinder which is connected to the test gear and on which a straight-edge is arranged to roll without slip to produce a generating motion, a sensor with a recording device being mounted, together with a guide track which in accordance with the helix angle of the gear is adjustable obliquely of the axis of the gear, on a slide which is displaceable parallel to the axis of the gear under test, said slide itself being supported on a rolling slide to be displaceable parallel to the straight-edge, the apparatus further comprising a lever with a longitudinal guideway and a pivot connection adjacent the rolling cylinder, said connection having an axis parallel to said rolling cylinder, the lever having further pivot connections with the rolling straight-edge and with an auxiliary slide the lever being longitudinally located by one of the pivot connections but the other of the pivot connections being slidable longitudinally of the lever an engagement element slideable in said guide track being mounted on said auxiliary slide and said gear axis being adjustably locatable relative to said rolling and auxiliary slides for a continuously variable ratio transmission of the rolling movement by way of said lever to the rolling slide and to the sensor, said lever interconnecting the auxiliary slide through said pivot connections with the rolling generating cylinder and the rolling straight-edge.

With one example of such apparatus, constructed according to U.S. Pat. No. 2,770,048, the working capacity is in principle restricted by the lever as regards rolling travel and swivelling angle. If the capacity is to be increased beyond a certain size, then the required increase in the dimensions of the apparatus could cause difficulties in operation or even require very costly auxiliary means and also could result in an uneconomical increase of the total weight.

FIG. 1 of the accompanying drawings shows some of the mechanism of the known constructional form of apparatus, including a gauging or measuring slide 2 arranged to be displaceable on a bed or base 1. Rotatably mounted on the bed 1 is a rolling generating cylinder 3 (so referred to throughout this specification although as well known in the art this mechanism element can be of flat disc form and may consist of only a segment of a cylinder). The rolling generating cylinder 3 engages in a slip-free manner with a rolling straight-edge 4, which is mounted for transverse sliding displacement on the bed 1.

A lever 5 is also mounted to be pivotable with and about the same pivot point as the rolling cylinder 3, in this it differs from the apparatus described in the aforesaid prior specification in which the pivotable lever has its equivalent pivot point spaced from the axis of the rolling cylinder, but in other respects FIG. 1 represents an apparatus which is similar in principle and as in that earlier specification, the lever is longitudinally located by a pivot connection, here represented by the pivot point on the cylinder axis for simplicity. A stud or pin 6 fixed on the straight-edge 4 engages, as an additional pivot point, in a longitudinal slot 7 of the lever 5, which is connected to other elements. The space required for the said lever 5 is designed for a maximum lever pivoting angle $\phi$ of 30° and even then requires awkward recesses 8 to provide the necessary space width B in the measuring slide 2, the figure showing the slide in full lines in its position for a smallest possible test gear wheel and in chain-dotted lines in its position for a largest possible test gear wheel.

SUMMARY OF THE INVENTION

It is an object of the invention to provide an apparatus which can be satisfactorily operated and may be of an economic size, while substantially increasing the working capacity as regards rolling distance and swivelling angle so as to produce an increased range of use in comparison with the known apparatus described above.

According to the invention, there is provided apparatus for testing the tooth flanks of involute gearing comprising a rolling generating cylinder to which a test gear can be pivotally secured and on which a straight-edge rolls in a slip-free manner, a tooth flank sensor for said gear and a guide track adjustable obliquely to the gear axis both being arranged on a slide to be displaceable parallel to the test gear wheel axis, said slide with the sensor and guide track being displaceable on a rolling slide parallel to said straight-edge, the apparatus further comprising a level that has a first pivot connection that permits it to pivot on the rolling cylinder, axis or an axis parallel thereto said lever having further pivot connections to the rolling straight-edge and to an auxiliary slide displaceable parallel to the rolling straight edge, said auxiliary slide carrying an engagement element slidable in said guide track whereby said lever interconnects the movements of the rolling straight-edge and the rolling slide, said rolling and auxiliary slides being jointly located at an adjustable distance from said gear axis for obtaining a continuously variable ratio transmission of the rolling movement to the auxiliary slide, the lever being mounted to be longitudinally displaceable with respect to said first pivot connection and also both said further pivot connections in order to allow the end points of the pivoting lever to remain within a given space in the apparatus housing.

With such an arrangement, because of the displaceability of the lever with respect to all three pivot connections, it is possible to provide larger rolling distances and lever-swivel angles for a given housing space and hence also a greater work-size capacity; it requires less space for a required checking capacity as compared with the known apparatus of a similar size.

DESCRIPTION OF THE PREFERRED EMBODIMENT

Figure 1:
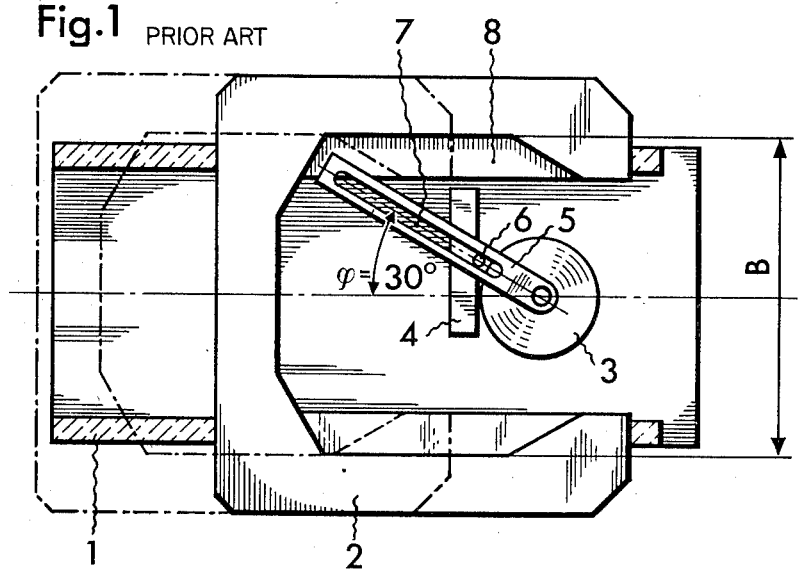
FIG. 1 illustrates in a diagrammatic manner the space which is required for accommodating the measurement slides and pivotable levers in the previously known constructional form of testing apparatus, as already described.
Figure 2:
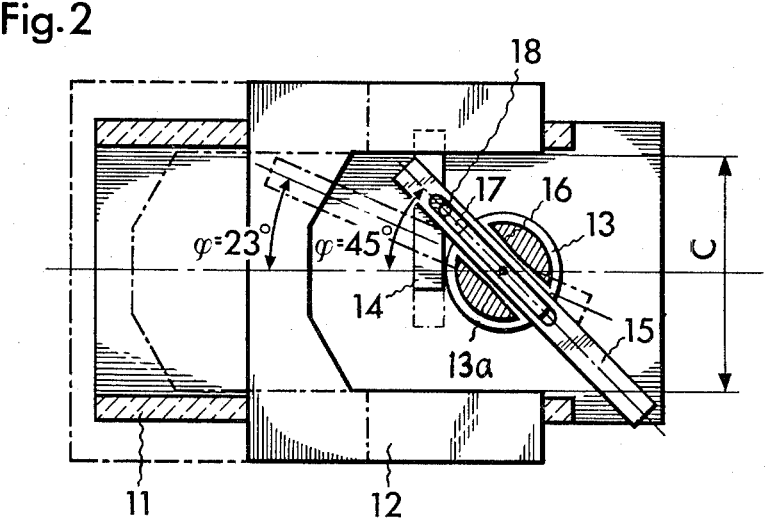
FIG. 2 is a diagrammatic illustration showing, for comparison with the apparatus in FIG. 1, the space which is required with one embodiment of testing apparatus according to the invention.

The diagrammatic illustration in FIG. 2 provides a comparison of apparatus according to the invention with respect to the earlier known apparatus in FIG. 1.

In FIG. 2 arranged for sliding displacement on a bed or base 11 is a gauging or measuring slide 12. Rotatably mounted on axis 13a on the bed 11 is a rolling generating cylinder 13 which engages in a slip-free manner with a rolling straight-edge 14 that in its turn is mounted to be slidably displaceable in the transverse direction on the bed 11. A lever 15 pivoting with the rolling cylinder 13 is guided so that it can be displaced longitudinally along a guideway 16 fixed relative to the cylinder. The guideway is formed with curved walls because the pivoting angle $\phi$ of the lever will not correspond to the angle of displacement of the cylinder 13 as the lever pivots away from a central position. A pin 18 on the straight-edge 14 engages in a longitudinal slot 17 of the lever 15 as a second pivot point thereof. The lever 15 is also connected to other elements which are described in connection with FIG. 6. The space required for the lever 15 is considerably smaller than that required for the prior construction, with a larger lever pivoting angle $\phi$, of even 45° for extremely small test gears (as compared with only 30° in FIG. 1), a width C provides sufficient space for the lever 15 (full-line position in FIG. 2). In the position shown in chain-dotted lines, extremely large gears are tested with a sufficiently large lever pivoting angle $\phi$ of 23°.

Figure 3:
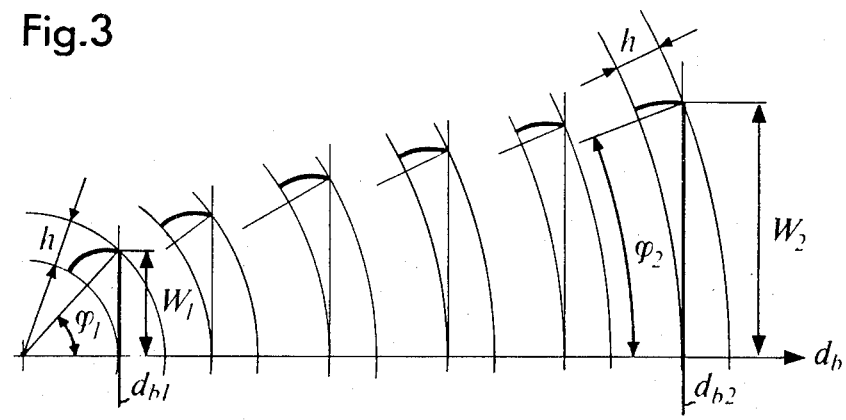
FIG. 3 is a schematic representation of the pivot angles and rolling paths in the tooth testing procedure as a function of the base circle diameter for a tooth flank, in respect of a certain constant tooth height (on the assumption that the involute development extends over the entire height of the tooth)

FIG. 3 shows pivot angle $\phi$ ($\phi_1$, $\phi_2$) and the rolling distances W ($W_1$, $W_2$) as a function of the base circle diameter $d_b$ ($d_{b1}$, $d_{b2}$) of a gear under test for a constant tooth height $h$ (on the simplified assumption that the development of the involute extends over the full tooth height $h$ and from the base circle $d_b$). The figure illustrates how the larger the gear being tested, the smaller is the swivelling angle $\phi$ for a constant tooth height $h$.

Figure 4:
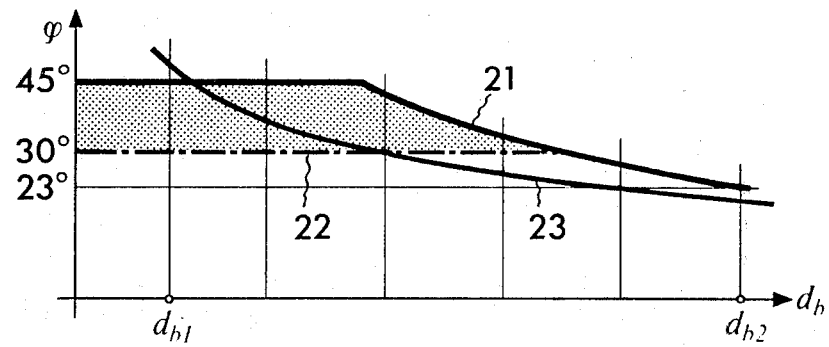
FIG. 4 illustrates in the form of a graph a comparison of the apparatus of FIG. 1 with the apparatus of FIG. 2 as regards the limits of the angles of pivoting as a function of the base circle diameter of a gear under test.

In FIG. 4, the respective capacity ranges in respect of the prior apparatus according to FIG. 1 and in respect of the apparatus according to FIG. 2 are shown in graph form for comparison purposes. In the figure, the maximum possible pivoting angles $\phi$ as a function of the base circle diameter $d_b$ have been plotted for apparatus of both forms of comparable size. The curve 21 represents the limits of the pivot angle $\phi$ for the apparatus according to the invention and the curve 22 represents the same limits for the known apparatus used for comparison. The difference as regards the two capacity ranges is indicated as a dotted area that shows the increase in capacity that may be obtained with the construction according to the invention. The curve 23 represents the pivot angle $\phi$ which is required for a specific constant tooth height $h$.

Figure 5:
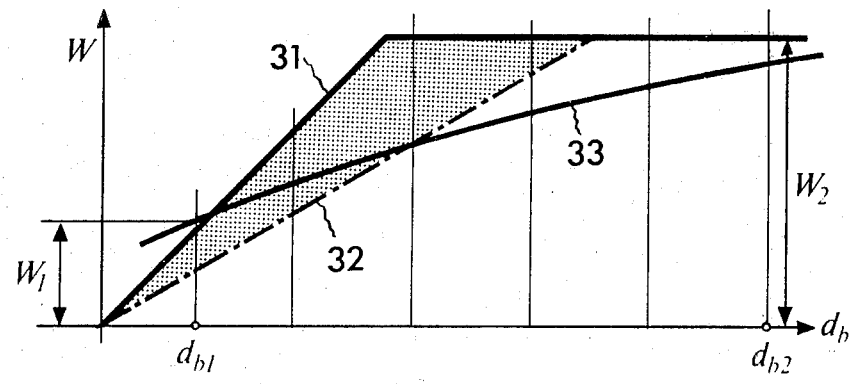
FIG. 5 illustrates in the form of a further graph a comparison of the apparatus of FIG. 1 with the apparatus of FIG. 2 as regards the limits of the extent of the rolling path as a function of the base circle diameter of a gear under test.

A further comparison of capacity ranges for the earlier apparatus according to FIG. 1 and for the apparatus according to FIG. 2 is shown in FIG. 5 with regard to the largest possible rolling path or distance W as a function of a base circle diameter $d_b$. The base circle diameters $d_{b1}$ and $d_{b2}$ are indicated and the difference in the two capacity ranges is indicated as a dotted area that shows the increase in capacity that can be attained in a comparable size apparatus according to the invention. The line 31 defines the range with $\phi = 45°$ for the arrangement according to the invention and the line 32 defines the range for $\phi = 30°$ for the earlier comparable construction. The curve 33 represents the rolling distance which is required for a certain constant tooth height $h$.

Figure 6:
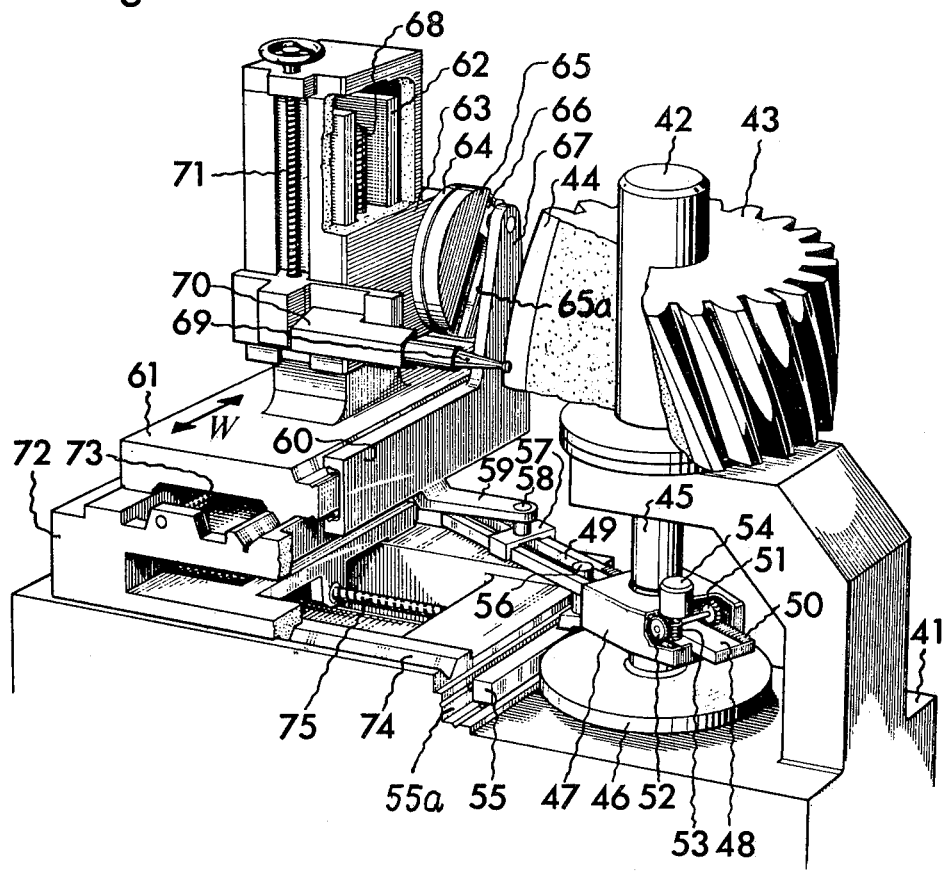
FIG. 6 shows in perspective and in diagrammatic form, a constructional example of apparatus according to the invention embodying the features described with reference to FIG. 2, and with a broken-away view of a gear under test on the apparatus in order to make visible the tooth flank which is being checked.
Figure 7:
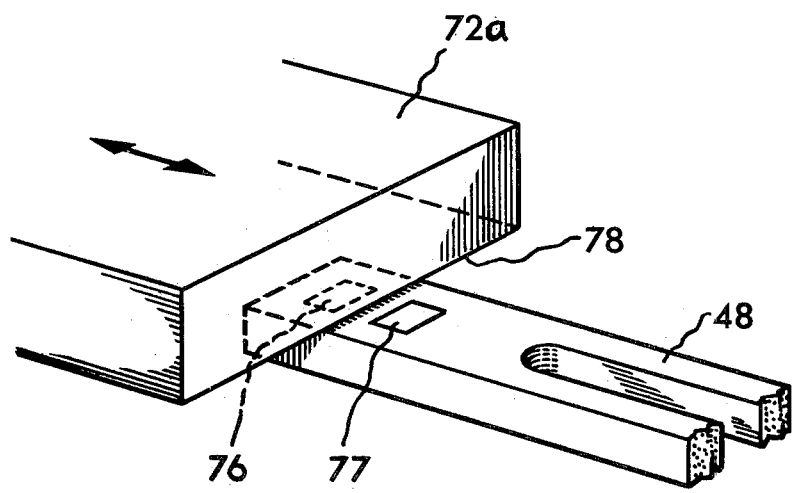
FIG. 7 is a diagrammatic illustration of a control element construction as one example of control means for the longitudinal displacement of the pivoting lever in the apparatus of FIG. 6.

The apparatus according to the invention, with the swivellable lever mounted for displacement at three pivot points, is represented in detailed form in FIG. 6 compared with FIG. 2.

Rotatably mounted on a bed 41 is a work spindle 42, and fixed on the spindle is a gear wheel 43, one tooth flank 44 of which is being tested. Fixed on an extension 45 of the work spindle 42 is a rolling generating cylinder 46 in the form of a disc, the extension 45 being releasably coupled to the work spindle 42 so as to be able to rotate the test gear 43 independently of the said cylinder 46. Fixed on and rotating with this extension 45 as a first pivot connection coaxial with the cylinder 46 is a swivel bearing 47, and mounted for longitudinal sliding displacement in said bearing is a pivotable lever 48, which is formed with a slot 49 and a toothed rack 50.

Meshing with the rack 50 is a pinion 51, which is mounted in the swivel bearing 47 and is rotated by a worm gear 52 that is driven through a worm 53 by a motor 54 fixed on the swivel bearing 47 and serving for the longitudinal adjustment of the rack 50 and thus of the lever 48.

A rolling straight-edge 55 is arranged in slip-free engagement with the disc 46 as a result of the two elements being pressed together. The straight-edge is guided for sliding displacement transversely of the bed 41 along a guide 55a. Fixed on the straight-edge 55 is a stud or pin 56, the axis of which is in the contact plane of the straight-edge 55 and cylinder 46, i.e. it is in a plane tangential to the peripheral surface of the cylinder. The pin 56 engages in the slot 49 of the lever 48 and provides the second pivot connection of the lever.

The lever 48 is also engaged by a pin-carrying slide 57 which can be displaced longitudinally relatively to the said lever. The guide means for the pin-carrying slide 57 is on the said lever 48, separately from the slot 49 providing the guide means for the pin 56. A pin 58 on the slide 57 which slidably embraces the lever 48 provides a third pivot connection of the lever and engages an arm 59 of an auxiliary slide 60, which is transversely displaceable on a rolling slide 61. Arranged on the rolling slide 61 is a perpendicular guideway 62, on which a slide 63 is vertically displaceable, and on the slide 63 is a plate 64, in which is adjustably mounted a grooved disc 65, the groove 65a of which is pivotably positionable according to the slope or helix angle of the tooth to be tested.

The groove 65a forms a guide track in which is engaged a block 66, which is fixed for rotatable movement on another arm 67 of the auxiliary slide 60. A spindle 68 moves the slide 63 up and down for testing the tooth slope. A sensor 69 is adjustably fixed on the slide 63 through a holder 70 that is displaceable by a spindle 71 for the adjustment of the sensor 69 in relation to the position of the test gear 43. The holder 70 is combined with a recording means for recording error curves indicated by the sensor.

The rolling slide 61 is arranged for transverse displacement on a measuring or gauging slide 72 by means of a spindle 73 for checking the involute of the tooth flank 44. The slide 72 is, in its turn, arranged to be displaceable longitudinally along a guideway 74 of the bed 41, by means of a spindle 75 for setting the base circle diameter $d_b$, i.e. for the continuously variable adjustment of the transmission ratio of the rolling or generating movement as regards the relative displacements of the straight-edge 55 and the rolling slide 61 and in order to set the probe into the required position.

The controlling action for the displacement of the lever 48 into a wanted longitudinal position is automatically produced by electrical contacts 76 and 77 of a control circuit for the motor 54, the contacts acting in co-operation with control edge 78 of forward portion 72a of the slide 72, so producing displacements in dependence upon the position of the measuring slide 72. This is effected during the adjustment of the slide 72 to a required base circle diameter $d_b$. The two electrical contacts 76, 77 on the lever 48 are associated with respective opposite directions of displacement the control circuit means by means of which such a reversible drive of the motor 54 is obtained being generally well known and needing no further description to those skilled in the art. With the automatically operating arrangement the maximum capacity as regards swivelling angle $\phi$ and rolling travel W is obtained with the smallest space requirement.

With the testing of the tooth flank 44 as regards the tooth profile, i.e. as regards conformity with the involute form, the measuring slide 72 is brought by means of the spindle 75 along the guideway 74 into a position which corresponds to the base circle diameter $d_b$ of the test gear 43. At the same time, the lever 48 is shifted into the most favourble position by means of the motor 54. By rotation of the spindle 73, the rolling slide 61 and hence also the sensor 69 are now displaced transversely corresponding to the rolling travel W, and at the same time the auxiliary slide 60 and the pin 58 are also correspondingly displaced. The slide 63 remains fixed during the test procedure and the auxiliary slide 60 and rolling slide 61 move as a unit. By means of the connection provided by the pin-carrying slide 57, the lever 48 is pivoted through the swivel angle $\phi$, and as a result the pin 56 displaces the straight-edge 55, the latter pivots the cylinder 46 and hence also the test gear 43: the rolling angle of the cylinder 46 (and of the test gear) is therefore somewhat larger than the swivel angle $\phi$ of the lever. If the tooth flank 44 has a theoretically exact involute, there will be no deflection of the sensor 69, which slides with these movements over the tooth profile.

When testing the tooth slope (helix trace) a start is made from the same base circle diameter $d_b$ for the same test gear and the grooved disc 65 is adjusted to set its guide track 65a at an oblique inclination that corresponds to the base helix angle. By rotating the spindle 68, the slide 63 and hence also the sensor 69 are displaced vertically while the rolling slide 61 is held fixed. This movement is transmitted by the oblique setting of the guide track 65a to the block 66 and thus to the auxiliary slide 60 that moves along the rolling slide 61. Through the pin 58 and the pin-carrying slide 57, the slide 60 pivots the lever 48 through the swivel angle $\phi$. The straight-edge 55 is also displaced by means of the pin 56 and as a result the rolling cylinder 46 and the test gear 43 are turned. As with the testing of the profile, the rolling angle of the cylinder 46 is somewhat larger than the swivel angle $\phi$ of the lever 48. With a theoretically accurate tooth slope or helix of the tooth flank 44, there will be no deflection of the sensor 69, which slides with these movements over the tooth flank in the longitudinal direction thereof.

What I claim and desire to secure by Letters Patent is:

1. Apparatus for testing the tooth flanks of involute gearing comprising test gear support means providing a rotary axis for a gear under test, a generating rolling cylinder connectable to said support means for rotation therewith, a rolling straight-edge mounted for slip-free rolling movement with said cylinder, a first slide mounted for displacement parallel to said rotary axis, a tooth flank sensor for said gear under test supported on said slide, and a guide carrier on said first slide supporting a guide track in an adjustable manner for locating said guide track at an adjustable oblique angle to said rotary axis, a rolling slide displaceable parallel to said rolling straight edge, said first slide with said sensor and guide carrier being mounted for displacement with said rolling slide, an auxiliary slide on said rolling slide and displaceable relative thereto parallel to said rolling straight-edge, follower means carried by said auxiliary slide engaging said guide track, a lever having a first pivot connection with the rolling cylinder comprising means permitting the lever to pivot around the axis of said cylinder, the lever having a second pivot connection with said rolling straight-edge and a third pivot connection with the auxiliary slide, said lever thereby interconnecting the movements of the rolling slide and of the sensor with the rolling straight-edge, the cylinder and the gear under test, means being provided for relative displacement of the third pivot connection with respect to the first and second pivot connections for the variable setting of the transmission ratio of said auxiliary slide to the rolling movements, said pivot connections comprising sliding guide means whereby the lever is mounted to be longitudinally displaceable with respect to all three said pivot connections.

2. Apparatus according to claim 1 further comprising a control and displacement mechanism for optimum adjustment of the lever longitudinal position with respect to the space requirement for desired pivot angles and rolling distances in the test procedure.

3. Apparatus according to claim 1 comprising at least two separate guide means on the lever for said longitudinal displacements relative to the three pivot connections.

4. Apparatus for testing tooth flanks of involute gearing comprising
   a. means for mounting a test gear for rotation about a predetermined axis,
   b. rolling generating means comprising a generating rolling cylinder connected to said mounting means for co-rotation with the gear, c. a straight-edge extending transverse to said axis and engaging said cylinder for rolling movement of said cylinder relative to the straight-edge without slip,
d. a sensor for co-operation with a tooth flank of a gear under test,
e. a guide track adjustable obliquely to said gear axis and securable relative to the sensor,
f. a first slide supporting said sensor and guide track, and mounting means for said slide permitting displacement of the slide parallel to said gear axis,
g. a rolling slide extending parallel to said straight-edge and supporting said mounting means for displacement of the sensor and guide track parallel to said straight-edge,
h. an auxiliary slide comprising a follower engaging said guide track,
i. means locating said auxiliary slide in fixed parallel relation to the rolling slide but permitting movements of the auxiliary slide parallel to the rolling slide and to said straight-edge,
j. a lever having a first pivot connection with an axis co-incident with the axis of the rolling generating cylinder for rotation about said cylinder axis, said pivot connection permitting longitudinal displacement of the lever relative thereto,
k. further pivot connections for said lever on the straight-edge and the auxiliary slide respectively,
i. guide elements for said further pivot connections permitting longitudinal displacements of the lever relative to each of said pivot connections, and
m. means for adjustably determining the relative displacement of the rolling slide and the first connection on the auxiliary slide with respect to the rolling cylinder and said further pivot connections for setting a desired transmission ratio between the movement of the auxiliary slide and the rolling motion of said cylinder.

* * * * *